May 22, 1928.

C. C. FARMER

BRAKE VALVE HANDLE

Filed Nov. 27, 1926

1,671,090

INVENTOR
CLYDE C. FARMER
BY Wm. M. Cady
ATTORNEY

Patented May 22, 1928.

1,671,090

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE HANDLE.

Application filed November 27, 1926. Serial No. 151,162.

This invention relates to brake valve devices, and more particularly to a brake valve handle.

The usual brake valve device is provided with a brake valve handle having a spring pressed latch adapted to engage in notches provided in a quadrant ring, for the purpose of defining the various operating positions of the brake valve handle.

With the usual brake valve handle of the above type, it is difficult for the engineer to determine whether the latch actually engages in the desired notch when the handle is manipulated, and the principal object of my invention is to provide a brake valve handle having means whereby the engineer will be made aware, by the sense of touch, when the latch properly engages a notch in the quadrant.

Figure 1:
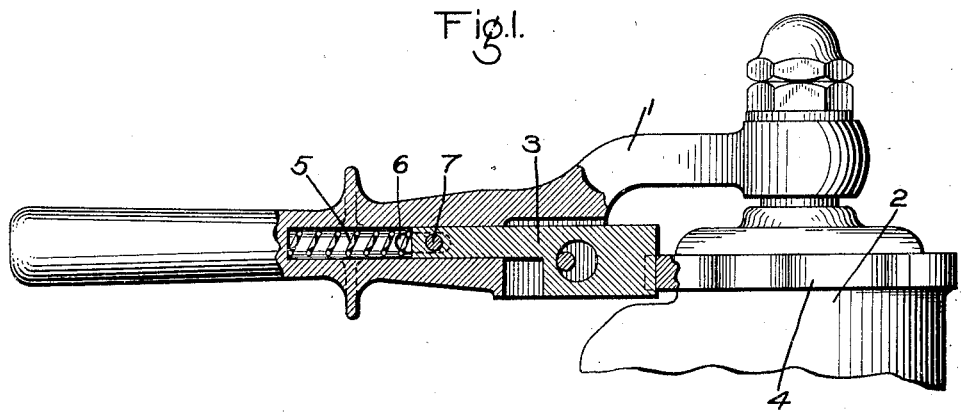
Figure 2:
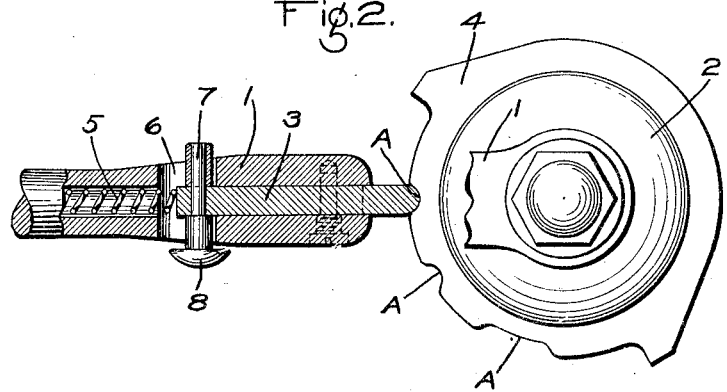

In the accompanying drawing; Fig. 1 is a side elevational view, partly in section, of a brake valve handle embodying my invention; and Fig. 2 a plan view thereof, partly in section.

As shown in the drawing, the brake valve handle 1, is associated with a brake valve device 2, and mounted in a bore of the handle is a latch 3, the outer end of which is adapted to engage notches A provided in the quadrant 4 of the brake valve device to define the different operating positions of the brake valve handle.

In the bore of the handle is a coil spring 5 which engages the end of the latch 3 and tends to press the latch into engagement with the quadrant 4.

According to my invention, the handle 1 is provided, adjacent to the inner end of the latch 3, with a horizontally disposed elongated slot 6 and extending through said slot and a hole in the end of the latch 3 is a pin 7 having a button 8 at one side, so exposed that the engineer can place a thumb or finger thereon when the handle is grasped.

When the handle is operated by the engineer, with a thumb or finger engaging the button 8, if the latch 3 falls into a notch A, the engineer will be made aware of the fact, by a corresponding movement of the button 8, so that he will know with certainty that the latch is actually engaging the notch.

Having now described my invention, what I claim as new and desire to secure by Letters Patent, is:—

1. The combination with a brake valve handle, of a latch movably mounted in said handle, and a pin carried by said latch and extending through a slot in said handle, said pin having an exposed portion adapted to be engaged by a portion of the hand in grasping the handle.

2. The combination with a brake valve handle, of a latch movably mounted in said handle, and a pin carried by said latch and extending through a slot in said handle, said pin having a button at one side adapted to be touched by the hand of an operator grasping the handle.

In testimony whereof I have hereunto set my hand.

CLYDE C. FARMER.